US007672279B2

(12) United States Patent
Sagfors

(10) Patent No.: US 7,672,279 B2
(45) Date of Patent: Mar. 2, 2010

(54) METHODS FOR DYNAMIC RADIO RESOURCE MANAGEMENT AND LINK CONTROL

(75) Inventor: Mats Sagfors, Kyrkslatt (FI)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 673 days.

(21) Appl. No.: 10/506,482

(22) PCT Filed: Mar. 6, 2003

(86) PCT No.: PCT/SE03/00383

§ 371 (c)(1),
(2), (4) Date: Sep. 2, 2004

(87) PCT Pub. No.: WO03/075486

PCT Pub. Date: Sep. 12, 2003

(65) Prior Publication Data

US 2005/0170841 A1     Aug. 4, 2005

(30) Foreign Application Priority Data

Mar. 6, 2002     (SE)     .................................... 0200696

(51) Int. Cl.
*H04W 4/00*     (2009.01)
*H04L 1/00*     (2006.01)
(52) U.S. Cl. ........................................ 370/338; 370/231
(58) Field of Classification Search ................. 370/310, 370/338, 231, 232, 233, 234; 455/453; 709/235, 709/224
See application file for complete search history.

(56) References Cited

U.S. PATENT DOCUMENTS

| 6,151,300 | A   |   | 11/2000 | Hunt et al. |
| 6,223,041 | B1  | * | 4/2001  | Egner et al. ............... 455/452.2 |
| 6,718,359 | B2  | * | 4/2004  | Zisapel et al. ............... 718/105 |
| 6,760,314 | B1  | * | 7/2004  | Iwata ........................... 370/254 |
| 6,801,502 | B1  | * | 10/2004 | Rexford et al. ............... 370/235 |
| 6,802,021 | B1  | * | 10/2004 | Cheng et al. .................... 714/4 |
| 6,853,851 | B1  | * | 2/2005  | Rautiola et al. ............ 455/553.1 |
| 7,047,312 | B1  | * | 5/2006  | Aweya et al. ................ 709/235 |
| 7,058,083 | B2  | * | 6/2006  | Melpignano et al. ......... 370/467 |
| 7,200,122 | B2  | * | 4/2007  | Goringe et al. .............. 370/255 |
| 2001/0050901 | A1 | * | 12/2001 | Love et al. ................... 370/235 |
| 2002/0016851 | A1 |   | 2/2002  | Border |
| 2002/0115413 | A1 | * | 8/2002  | Saarinen et al. ............. 455/67.1 |
| 2003/0079041 | A1 | * | 4/2003  | Parrella et al. ............... 709/247 |

(Continued)

OTHER PUBLICATIONS

Hua Xu et al, Performance analysis on the radio link control protocol of UMTS system, In: Vehicular Technology Conference, 2002, Proceedings from VTC 2002-Fall. 2002 IEEE 56$^{th}$ pp. 2026-2030, vol. 4, 2002.

(Continued)

*Primary Examiner*—George Eng
*Assistant Examiner*—Christopher M Brandt
(74) *Attorney, Agent, or Firm*—Roger S. Burleigh

(57) ABSTRACT

The present invention relates to transmission and retransmission of packet data in a communications system, where the communications system uses rate switching or channel switching. It provides an interface for information exchange between radio resource management and one or more transport protocol entities in a cellular mobile radio system, particularly a Universal Mobile Telecommunications System, UMTS, or WCDMA system.

24 Claims, 3 Drawing Sheets

U.S. PATENT DOCUMENTS

2003/0097461 A1* 5/2003 Barham et al. .............. 709/235
2003/0179720 A1* 9/2003 Cuny .......................... 370/310
2004/0052234 A1* 3/2004 Ameigeiras et al. ......... 370/338

OTHER PUBLICATIONS

Swedish Patent Office, International Search Report for PCT/SE03/00383, dated May 19, 2003.

* cited by examiner

METHODS FOR DYNAMIC RADIO RESOURCE MANAGEMENT AND LINK CONTROL

TECHNICAL FIELD OF THE INVENTION

The present invention relates to transmissions and retransmissions of packet data in a communications system, where the communications system uses rate switching or channel switching. Especially, it relates to radio link load control in a cellular mobile radio system, particularly a Universal Mobile Telecommunications System, UMTS, or WCDMA system.

BACKGROUND AND DESCRIPTION OF RELATED ART

Radio resource management and admission control are fundamental features of a radio communications system sharing radio resources between users, user sessions and radio bearers.

In packet data communications, transport protocols, such as TCP, involving congestion control are widely used.

*The Internet Society: Request for Comments (RFC) No. 793, Transmission Control Protocol, DARPA Internet Program Protocol Specification*, September 1981 describes the functions to be performed by the Transmission Control Protocol (TCP), the program that implements it, and its interface to programs or users that require its services.

The Internet program protocol specification discusses a receiver advertised window, rwnd, used e.g. in congestion control and the impact of a shrinking rwnd. It also discusses how TCP should operate in relation to rwnd.

*The Internet Society: Request for Comments (RFC) No. 2581*, April 1999 specifies in detail TCP congestion control. One of the control parameters is the congestion window, cwnd, another is the advertised receiver window, rwnd.

During Congestion Avoidance cwnd is increased in relation to round-trip time until a packet loss is detected, which is interpreted as congestion. This is e.g. the case if a retransmission timer times out without a packet being acknowledged during the retransmission time of the packet.

At the beginning of a data transfer TCP probes the network for its conditions. For each (positively) acknowledged data packet, the sender-side increases cwnd until it reaches a threshold ssthresh. During data transfer cwnd and ssthresh are adapted in relation to received acknowledgements.

The advertised receiver window, rwnd, is transmitted together with acknowledgments from TCP receiver to TCP sender, acknowledging received TCP packets.

The RFC also defines the concepts segment, receiver maximum segment size, RMSS, and sender maximum segment size, SMSS. cwnd is an integer multiple of SMSS.

A segment is any TCP/IP data or acknowledgment packet (or both). The RMSS is the size of the largest segment the receiver is willing to accept. The SMSS is the size of the largest segment that the sender can transmit. SMSS can be set to the maximum transmission unit, MTU, of the network, a path MTU (see below) or RMSS.

*The Internet Society: Request for Comments (RFC) No. 1191*, November 1990 describes a technique for dynamically discovering a maximum transmission unit, MTU, of an arbitrary Internet path. A path MTU, PMTU, is the minimum of the MTUs of each hop of the path. Upon receipt of a "Datagram too big" message, the host reduces initially assumed PMTU for the path. RFC1191 suggests that also MTU size is reported in association with the "Datagram too big" message. Normally, if the route changes and the new PMTU is lower, it will be discovered. For detection of increased PMTU, the segment size can be increased periodically. The RFC discusses TCP actions and management interface.

*The Internet Society: Request for Comments (RFC) No. 3150*, July 2001 discusses interactions between TCP Congestion Control and TCP Buffer Auto-tuning. The RFC recommends that if a host is connected over links of different speeds at different times, the host may use receive buffer auto-tuning to adjust the advertised window to an appropriate value.

R. W. Stevens: *TCP/IP Illustrated*, Volume 1, Addison-Wesley, Reading Mass., 1994, describes in section 1.2 layering of networking protocols and the combination of different protocols into a protocol suite. Stevens describes a 4-layer system with layers link layer,
 network layer,
 transport layer, and
 application layer.

The link layer is also called data link layer, and could e.g. include a device driver in an operating system of a computer. The network layer handles packet movements such as packet routing. Examples of the network layer include IP (Internet Protocol), ICMP (Internet Control Message Protocol), and IGMP (Internet Group Management Protocol). The transport layer concerns' data flows between two hosts. Examples of transport layer protocols are TCP (Transport Control Protocol) and UDP (User Datagram Protocol). The application layer handles application details. Well-known exemplary application layer protocols are FTP (File Transfer Protocol) and SMTP (Simple Mail Transfer Protocol).

P. Kuhlberg: *Effect of Delays and Packet Drops on TCP-based Wireless Data Communication, Master's* Thesis, University of Helsinki, Dept. of Computer Science, December 2000, discusses in appendix D topics to be further investigated. Included is investigation of receiver window impact on TCP performance.

P. Sarolahti, A. Gurtov, P. Kuhlberg, M. Kojo, K. Raatikainen: *Tuning TCP Advertised Window for Bottleneck Links with Variable Delays,* to appear in ICC 2002, April 2002 suggests halving the advertised window for each connection when a new TCP connection starts using a bottleneck link in parallel with an existing TCP connection and maintenance of a common window space for all connections to a mobile station based on link bandwidth-delay estimation at receiver. Each TCP connection gets to advertise its fair share of the shared window space.

$3^{rd}$ Generation Partnership Project (3GPP), *Technical Specification Group Radio Access Network, Radio Resource Management Strategies,* 3GPP TS 25.922 v3.6.0, France, September 2001, illustrates in section 6.3 some scenarios of Admission Control in relation to radio resource management, RRM. Radio bearer control is described in section 7.

Within this patent application, a radio network controller, RNC, is understood as a network element including an RRM (Radio Resource Management) entity. The RNC is connected to a fixed network. Node B is a logical node responsible for radio transmission/reception in one or more cells to/from a User Equipment. A base station, BS, is a physical entity representing Node B. A server device provides information accessible to other devices over a communications network such as, e.g., the Internet.

With reference to FIG. 1, base stations <<BS 1>> and <<BS 2>> are physical entities representing Nodes B <<Node B 1>> and <<Node B 2>> respectively. <<Node B 1>> and <<Node B 2>> terminate the air interface, called Uu interface within UMTS, between UE and respective Node B towards the radio network controller <<RNC>>. <<RNC>> is connected to a fixed network <<Network>>. The fixed network may comprise one or more Server Devices <<Server Device>>.

In FIG. 1, the base stations are connected to the same radio network controller RNC. However, this specification also covers the exemplary situation where the base stations are connected to different RNCs. In UMTS, the RLC protocol is terminated in a serving RNC, SRNC, responsible for interconnecting the radio access network of UMTS to a core network.

3$^{rd}$ Generation Partnership Project (3GPP): *Technical Specification Group Radio Access Network, Radio Interface Protocol Architecture,* 3GPP TS 25.301 v3.6.0, France, September 2000, describes an overall protocol structure of a Universal Mobile Telecommunications System (UMTS). There are three protocol layers:
   physical layer, layer 1 or L1,
   data link layer, layer 2 or L2, and
   network layer, layer 3 or L3.

Layer 2, L2, and layer 3, L3 are divided into Control and User Planes. Layer 2 consists of two sub-layers, RLC and MAC, for the Control Plane and four sub-layers, BMC, PDCP, RLC and MAC, for the User Plane. The acronyms BMC, PDCP, RLC and MAC denote Broadcast/Multicast Control, Packet Data Convergence Protocol, Radio Link Control and Medium Access Control respectively.

FIG. 2 displays a simplified UMTS layers 1 and 2 protocol structure for a Uu Stratum, UuS, or Radio Stratum, between a user equipment UE and a Universal Terrestrial Radio Access Network, UTRAN.

Radio Access Bearers, RABs, are associated with the application for transportation of services between core network, CN, and user equipment, UE, through a radio access network. Each RAB is associated with quality attributes such as service class, guaranteed bit rate, transfer delay, residual BER, and traffic handling priority. An RAB may be assigned one or more Radio Bearers, RBs, being responsible for the transportation between UTRAN and UE. For each mobile station there may be one or several RBs representing a radio link comprising one or more channels between UE and UTRAN. Data flows (in the form of segments) of the RBs are passed to respective Radio Link Control, RLC, entities which amongst other tasks buffer the received data segments. There is one RLC entity for each RB. In the RLC layer, RBs are mapped onto respective logical channels. A Medium Access Control, MAC, entity receives data transmitted in the logical channels and further maps logical channels onto a set of transport channels. In accordance with subsection 5.3.1.2 of the 3GPP technical specification MAC should support service multiplexing e.g. for RLC services to be mapped on the same transport channel. In this case identification of multiplexing is contained in the MAC protocol control information.

Transport channels are finally mapped to a single physical channel which has a total bandwidth allocated to it by the network. In frequency division duplex mode, a physical channel is defined by code, frequency and, in the uplink, relative phase (I/Q). In time division duplex mode a physical channel is defined by code, frequency, and timeslot. As further described in subsection 5.2.2 of the 3GPP technical specification the L1 layer is responsible for error detection on transport channels and indication to higher layer, FEC encoding/decoding and interleaving/deinterleaving of transport channels.

None of the cited documents above discloses a method and system for interaction between radio resource management/radio link layer and transport protocol dynamics.

SUMMARY OF THE INVENTION

Radio Resource Management of a radio communications system, such as a WCDMA system, may dynamically adapt the bandwidth of a radio connection. Since the radio link bandwidth varies a lot, a transport protocol should adapt thereto. This could be achieved from interchange of information with radio resource management.

Consequently, it is an object of this invention to provide a method and system for exchange of information between radio resource management and one or more transport protocol entities, such as TCP entities, and particularly to adapt transport protocol load control to link state information.

A related object is to provide data for efficient load control to the transport protocol for links with high latencies, and varying link characteristics, including bandwidth, BLER (block error rate) and RTT (round-trip time).

It is also an object of this invention to provide information transfer in the reverse direction, from transport protocol to radio resource management/radio resource control.

A further object is to accomplish buffer management and rate matching to meet the requirements as demanded by transport protocols.

Finally, it is an object to introduce a mechanism for load control in addition to relying on packet losses.

These objects are met by the invention, which is particularly well suited for a Universal Mobile Telecommunications System, UMTS, providing an interface between a transport protocol entity and channel resource management, particularly radio resource management.

Preferred embodiments of the invention, by way of examples, are described with reference to the accompanying drawings below.

DESCRIPTION OF PREFERRED EMBODIMENTS

Radio Resource Management of a radio communications system, such as a WCDMA system, may dynamically adapt the bandwidth of a radio connection. Since the radio link bandwidth varies a lot, a transport protocol should adapt thereto and interchange information with radio resource management.

The Transmission Control Protocol, TCP, is the main transport layer carrier of packet data in today's Internet. Wireless Internet access must therefore be designed to support TCP or other transport layer carriers operating similarly.

For the exemplary protocol TCP, a wireless link is a main contributor to highly time-varying demands on TCP load. The reasons are:

the radio link rate is varying due to radio resource management, and the wireless link may introduce substantial latencies into the TCP connection due to retransmissions over the air interface to recover transmission errors, as imposed by a radio link control protocol, varying required number of retransmissions and propagation distances cause varying round-trip time.

The radio link buffers of a radio network controller cannot be increased extensively, since this would lead to over-buffered links with long TCP round-trip time delays.

Because of the difficulties of adapting to radio link dynamics at a TCP sender with no means for receiving explicit radio link information from the TCP receiver, this invention suggests interaction between radio resource management and TCP receiver, determining its advertised window, rwnd, making use of the fact that the TCP sender advertises rwnd to TCP sender. The invention solves the identified problems of TCP and other transport protocols operating similarly.

When link limitations affecting a TCP sender window basically resides on the sender side prior art solutions incorporate this information for sender window adjustments at a considerable delay having the information being fed back from the TCP receiver side in acknowledgements or detected lack of acknowledgement. It is observed that much of this information can be made available to TCP from radio resource management for incorporation into the sender window control at a considerable smaller delay. Thereby, also the risk of overflowing radio link buffers and number of lost packets can be reduced.

Figure 3:
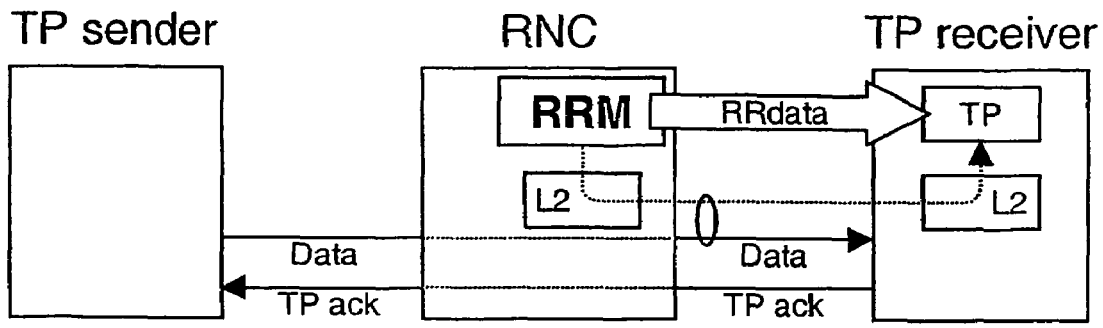
FIG. 3 displays a first embodiment for downlink radio resource management and load control, according to the invention.

FIG. 3 displays a first embodiment for downlink radio resource management and load control, according to the invention. A transport protocol sender <<TP sender>>, e.g. a TCP sender of a Web Server corresponding to <<Server Device>> of FIG. 1, transmits data packets <<Data>>, e.g. TCP packets, to a transport protocol receiver <<TP receiver>>, e.g. a TCP receiver of UMTS User Equipment <<UE>> illustrated in FIG. 1.

For reasons of implementation of the invention it is preferred that the transport protocol layer entity <<TP>> is included in or co-located with a radio link control protocol layer entity <<L2>>.

When distributed over a radio communications system, such as UMTS, the protocol packets are passed over a radio network control node <<RNC>>. A radio resource management entity <<RRM>> responsible for allocating radio resources to various radio connections transmits radio resource data <<RRdata>>, including e.g. data rate and radio link round-trip time delay data, to transport protocol receiver <<TP receiver>>, <<TP>>. According to the first embodiment of the invention, at least one parameter affecting load control, e.g. rwnd or RMSS, is determined on basis of the radio resource data.

Typically, radio resource data <<RRdata>> is transmitted over the same radio interface as payload <<Data>>, involving radio link control protocol layer <<L2>> of radio network controller <<RNC>> and transport protocol receiver <<TP receiver>>, respectively. This is indicated by a dotted line.

A common rule of dimensioning rwnd is to set the window size in relation to the link bandwidth delay product, increased for buffering. Assuming that the radio link is the bottleneck link, setting the link capacity, $LC_{link}$, proportional to the bandwidth delay product of the radio link is one exemplary rule for determining rwnd.

Assuming a connection being allocated a bit rate of 64 kbit/s and experiencing a radio link RTT in the range of 300-700 ms, would then yield a link capacity $LC_{down,link}$ of approximately 5 kbyte. Designing rwnd in the range $LC_{down,link}<\text{rwnd}<LC_{down,link}+B_{down}$, where $B_{down}$ is downlink radio link buffer size, would result in exemplary practically usable rwnd in the range of 6-10 kbyte.

A radio link up-switch to e.g. 384 kbit/s would, with the same radio link RTT, yield a link capacity $LC_{down,link}$ of approximately 30 kbyte and result in exemplary practically usable rwnd in the range of 35-50 kbyte.

Transport protocol receiver <<TP receiver>> advertises rwnd to the transport protocol sender <<TP sender>> by including rwnd in transport protocol acknowledgements <<TP ack>>.

Preferably, the transport protocol receiver <<TP receiver>> adjusts the receiver maximum segment size to the radio link characteristics.

According to prior art it is often preferable to keep transfer delay smaller than approximately 100-200 ms. This will introduce a limit on maximum size of segments to transfer. It is however also desirable to use large segments to enhance TCP dynamics, when the bandwidth-delay product of a connection is large.

As an explicit non-exclusive example, consider a 384 kbit/s bearer. Transfer delay of a segment of 1.5 kbyte will then be approximately 32 ms, which is less than 100-200 ms. However, for a 8 kbit/s the transfer delay of the same segment will be 1.5 s, significantly greater than 100-200 ms.

According to the invention, it is possible to dynamically change the segment size based on link conditions.

Figure 1:
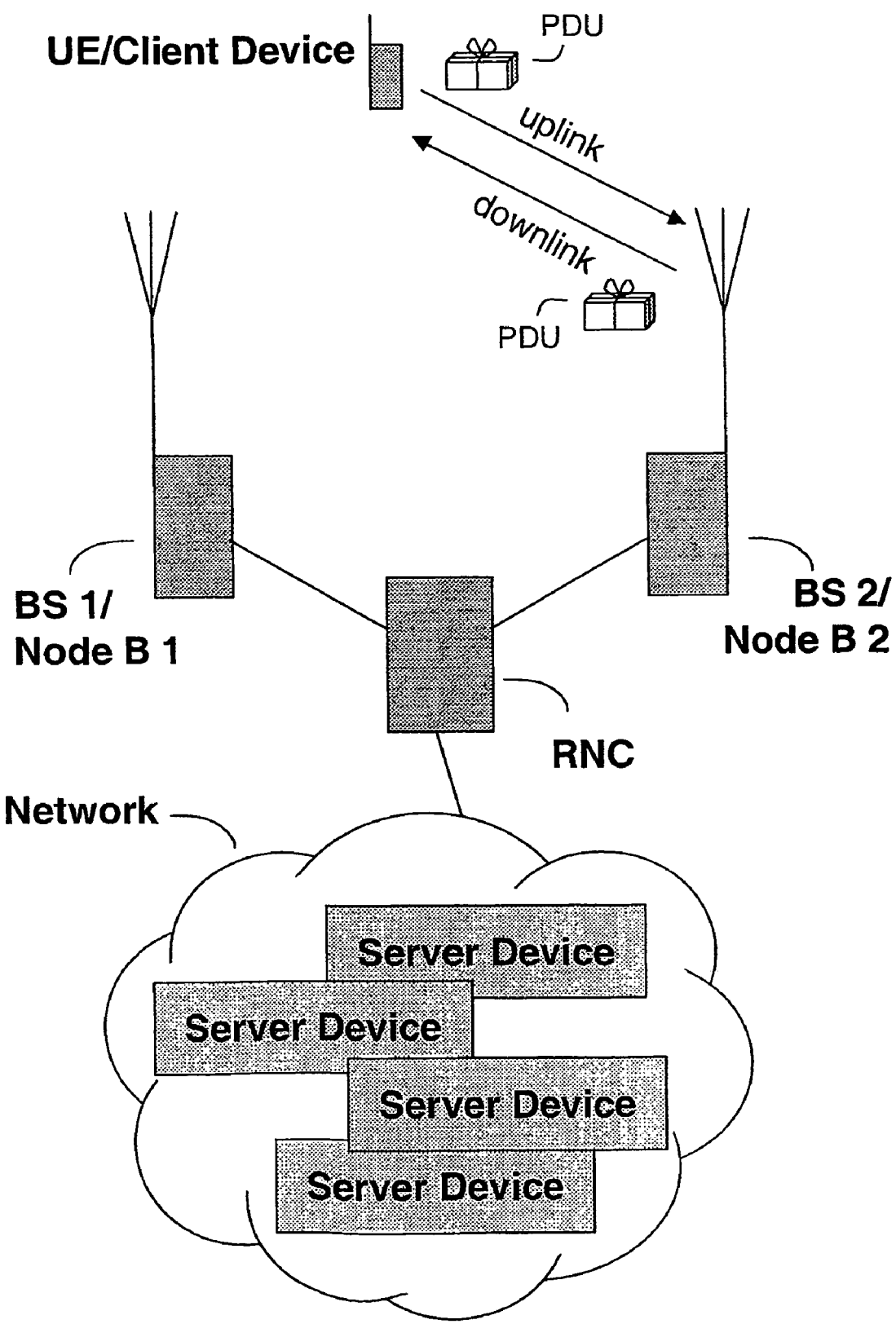
FIG. 1 shows communication between a UE and a base station involved in a connection between an RNC and the UE.
Figure 2:
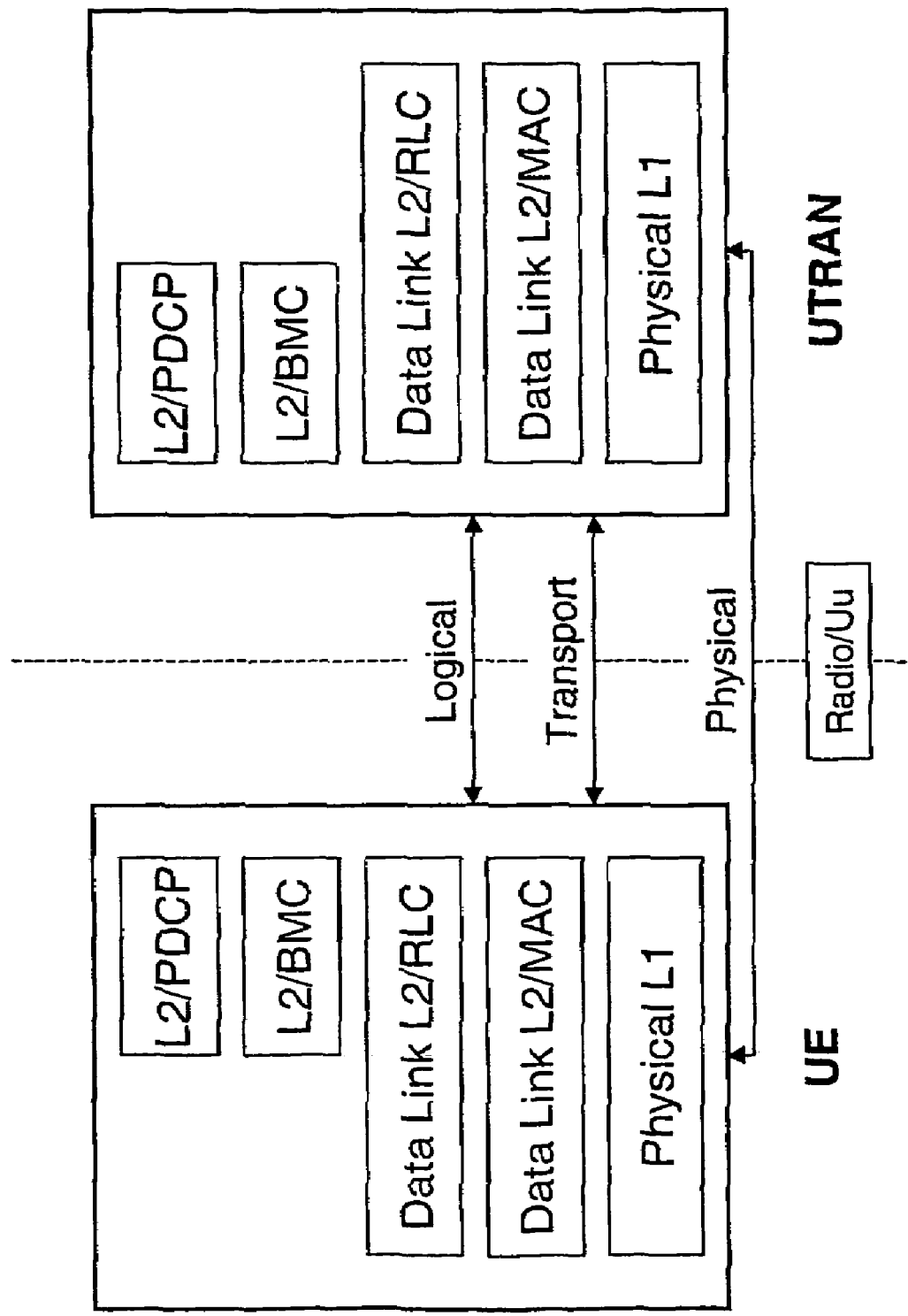
FIG. 2 displays a layered protocol structure, according to prior art, in a radio communications system.
Figure 4:
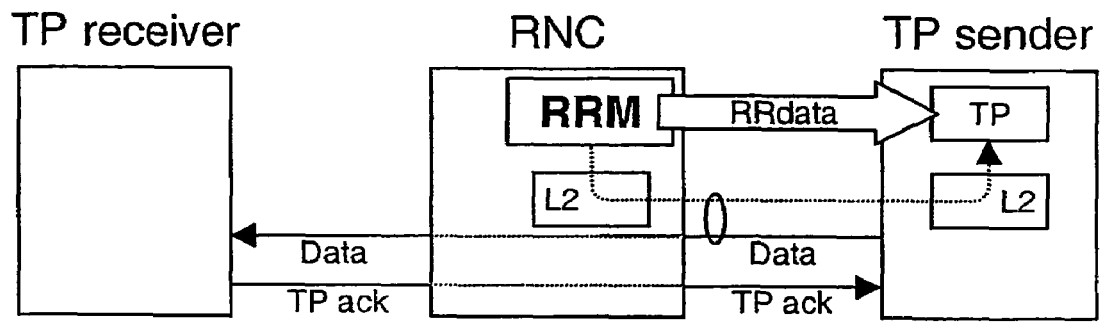
FIG. 4 displays a second embodiment for uplink radio resource management and load control, according to the invention.

FIG. 4 displays an embodiment for uplink radio resource management and load control, according to the invention. A transport protocol sender <<TP sender>>, e.g. a TCP sender of UMTS User Equipment <<UE>> as illustrated in FIG. 1, transmitting data packets <<Data>>, e.g. TCP packets, to a transport protocol receiver <<TP receiver>>, e.g. a TCP receiver of a Web Server corresponding to <<Server Device>> of FIG. 1.

A radio resource management entity <<RRM>>, responsible for allocating radio resources to various radio connections, transmits radio resource data <<RRdata>>, including e.g. data rate and radio link round-trip time delay data, to transport protocol receiver <<TP receiver>>, <<TP>>, preferably over a radio link control protocol layer <<L2>>, as indicated by a dotted line. According to the second embodiment, the radio resource data forms a basis for determining at least one load control parameter.

An upper limit $\text{cwnd}_{lim}$ is preferably imposed on the congestion window cwnd of transport protocol sender, such that $\text{cwnd}<\text{cwnd}_{lim}$, where $\text{cwnd}_{lim}$ is determined on basis of the radio resource data, according to the invention. Thereby overflowing of radio link buffers, due to TCP overflowing the radio link buffer, can be avoided. The imposed upper limit on cwnd, $\text{cwnd}_{lim}$, corresponds to the designed size of rwnd, i.e. in the range $LC_{up,link}<\text{cwnd}_{lim}<LC_{up,link}+B_{up}$, where $B_{up}$ is uplink radio link buffer size, for uplink capacity, $LC_{up,link}$.

Preferably, the transport protocol sender <<TP sender>> adapts the sender maximum segment size to the link conditions. The reasoning of the adaptation corresponds to that of adaptation of the receiver maximum segment size.

Figure 5:
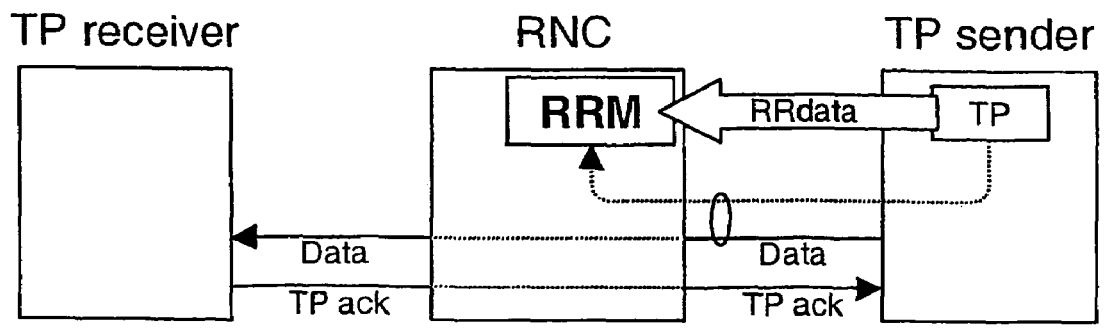
FIG. 5 illustrates schematically a third embodiment for radio resource management and load control, according to the invention.

FIG. 5 illustrates schematically a third embodiment for radio resource management and load control, according to the invention.

A transport protocol sender <<TP sender>> comprises a transport protocol layer entity <<TP>>. The transport protocol sender <<TP sender>>, e.g. a TCP sender of UMTS User Equipment, sends data packets <<Data>> to a transport protocol receiver <<TP receiver>>.

When distributed over a radio communications system, such as UMTS, the protocol packets are passed over a radio network control node <<RNC>>. According to the third embodiment, a radio resource management entity <<RRM>>, responsible for allocating radio resources to various radio connections, receives radio resource data <<RRdata>> sent from transport protocol sender <<TP sender>>, the radio resource data comprising information on transport protocol sender requested data rate or bit rate or other information related to data amount of requested data objects. This is used in radio resource management <<RRM>> for dynamic prediction of bandwidth needs. Typically, radio resource data <<RRdata>> is transmitted over the same radio interface as payload <<Data>>. This is indicated in the figure by a dotted line.

As in FIG. 3, transport protocol receiver <<TP receiver>> may acknowledge <<TP ack>> received transport protocol layer packets <<Data>> to transport protocol layer sender <<TP sender>>.

It should be apparent to the reader that the embodiments described in each of FIGS. 3-5 readily can be combined and are particularly suitable for a transport protocol entity, such as a TCP entity, comprising both transport protocol receiver and transport protocol sender.

Preferably, all system elements, such as UEs and RNCs in UMTS, where applicable operate according to the invention. However, the invention can also be used in systems also including some equipment, such as UEs and RNCs, not operating according to the invention.

A person skilled in the art readily understands that the receiver and transmitter properties of a BS or a UE are general in nature. The use of concepts such as BS, UE or RNC within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without a subscriber identity module, SIM, as well as user equipment including one or more SIMs. Further, protocols and layers are referred to in close relation with UMTS and Internet terminology. However, this does not exclude applicability of the invention in other systems with other protocols and layers of similar functionality. As a non-exclusive example, the invention applies for radio resource management interfacing of a connection protocol application layer as well as interfacing of a connection protocol transport layer, such as TCP.

The invention is not intended to be limited only to the embodiments described in detail above. Changes and modifications may be made without departing from the invention. It covers all modifications within the scope of the following claims.

The invention claimed is:

1. A method of load control between a transport protocol sender and transport protocol receiver in a radio communications system, the method comprising the step of:
    transferring to said transport protocol receiver one or more signals carrying radio resource data from a radio resource management entity located in a radio network control node intermediate to said transport protocol sender and said transport protocol receiver, said transport protocol receiver using said radio resource data received from the radio resource management entity to dynamically adapt transport protocol load to link state information between the transport protocol sender and the transport protocol receiver.

2. The method according to claim 1, wherein the radio resource management entity is a radio network controller.

3. The method according to claim 2, wherein the radio network controller controls radio resources of user equipment including said transport protocol receiver.

4. A method of load control between a transport protocol sender and transport protocol receiver in a radio communications system, the method comprising the step of:
    transferring to said transport protocol receiver one or more signals carrying radio resource data from a radio resource management entity located in a radio network control node intermediate to said transport protocol sender and said protocol receiver; and
    transferring one or more signals carrying said radio resource data from a radio link control protocol layer to a transport protocol layer of said transport protocol receiver, said transport protocol layer using said radio resource data received from the radio resource management entity to dynamically adapt transport protocol load to link state information between the transport protocol sender and the transport protocol receiver.

5. The method according to claim 4, further comprising the step of determining a transport protocol parameter on the basis of said radio resource data.

6. The method according to claim 5, wherein the transport protocol parameter comprises a receiver advertised window or a receiver maximum segment size.

7. The method according to claim 6, further comprising the step of including the transport protocol parameter in a transport protocol acknowledgement to a transport protocol sender.

8. The method according to claim 7, wherein the transport protocol parameter is a parameter of congestion control in the transport protocol sender.

9. The method according to claim 8, wherein the transport protocol receiver comprises a User Equipment.

10. A method of load control between a transport protocol sender and transport protocol receiver in a radio communications system, the method comprising the step of:
    transferring to said transport protocol sender one or more signals carrying radio resource data from a radio resource management entity located in a radio network control node intermediate to said transport protocol sender and said transport protocol receiver, said transport protocol sender using said radio resource data received from the radio resource management entity to dynamically adapt transport protocol load to link state information between the transport protocol sender and the transport protocol receiver.

11. The method according to claim 10 wherein the radio resource management entity comprises a radio network controller.

12. A method of load control between a transport protocol sender and transport protocol receiver in a radio communications system, the method comprising the step of:
    transferring to said transport protocol sender one or more signals carrying radio resource data from a radio resource management entity located in a radio network control node intermediate to said transport protocol sender and said transport protocol receiver; and
    transferring one or more signals carrying said radio resource data from a radio link control protocol layer to a transport protocol layer of said transport protocol sender, said transport protocol layer using said radio resource data received from the radio resource management entity to dynamically adapt transport protocol load to link state information between the transport protocol sender and the transport protocol receiver.

13. The method according to claim 12, further comprising the step of determining a transport protocol parameter on the basis of the transferred radio resource data.

14. The method according to claim 13, wherein the transport protocol parameter comprises a sender maximum send window or a sender maximum segment size.

15. The method according to claim 14, wherein the sender maximum send window is the upper limit for a transport protocol congestion control send window.

16. The method according to claim 15, wherein the radio resource data comprises link state information selected from the group consisting of:
    radio link data rate;
    round-trip time;
    block error rate;
    delay; and
    packet loss rate.

17. The method according to claim 16, wherein said method provides dynamic load control.

18. A method of radio resource management between a transport protocol sender and transport receiver in a radio communications system, the method comprising the step of:
    transferring one or more signals carrying radio resource from a transport protocol sender to a radio resource management entity located in a radio network control node intermediate to said transport protocol sender and said transport protocol receiver, said radio resource management entity using said radio resource data received from the radio resource management entity to dynamically assign radio resources to link state information between the transport protocol sender and the transport protocol receiver.

19. The method according to claim 18, wherein the radio resource management entity comprises a radio network controller.

20. The method according to claim 19, wherein radio link data rate is determined on the basis of the transferred radio resource data.

21. The method according to claim 20, wherein the radio resource data is selected from the group consisting of:
    requested radio link data rate; and
    data related to data amount of one or more requested data objects.

22. The method according to claim 21, wherein the transport protocol sender comprises User Equipment.

23. The method according to claim 22, wherein the radio network controller controls radio resources of user equipment including the transport protocol sender.

24. The method according to claim 23, wherein the transport control protocol is the Transport Control Protocol, TCP, used on the Internet.

* * * * *